(12) United States Patent
Yamaguchi

(10) Patent No.: US 10,328,510 B2
(45) Date of Patent: Jun. 25, 2019

(54) FIXING STRUCTURE OF WIRE BOBBIN AND FIXING METHOD OF THE SAME

(71) Applicant: FANUC CORPORATION, Yamanashi (JP)

(72) Inventor: Meguru Yamaguchi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/920,506

(22) Filed: Mar. 14, 2018

(65) Prior Publication Data

US 2018/0264572 A1    Sep. 20, 2018

(30) Foreign Application Priority Data

Mar. 17, 2017    (JP) .................................. 2017-052133

(51) Int. Cl.
| | |
|---|---|
| *B23H 7/10* | (2006.01) |
| *B23H 7/08* | (2006.01) |
| *B65H 49/36* | (2006.01) |
| *F16B 37/08* | (2006.01) |
| *B23H 11/00* | (2006.01) |

(52) U.S. Cl.
CPC ................. *B23H 7/10* (2013.01); *B23H 7/08* (2013.01); *B65H 49/36* (2013.01); *B23H 11/00* (2013.01); *B65H 2701/36* (2013.01); *F16B 37/0814* (2013.01)

(58) Field of Classification Search
CPC .. B23H 7/08; B23H 7/10; B65H 49/36; F16B 37/0814

USPC ......................................................... 411/437
See application file for complete search history.

(56) References Cited

U.S. PATENT DOCUMENTS

| | | | |
|---|---|---|---|
| 6,398,147 B1 | 6/2002 | Fredrickson | |
| 7,184,520 B1 * | 2/2007 | Sano .................... | H01J 35/101 378/121 |
| 2012/0125245 A1 | 5/2012 | Troncoso et al. | |

(Continued)

FOREIGN PATENT DOCUMENTS

| | | |
|---|---|---|
| DE | 102009021597 A1 | 11/2010 |
| FR | 882541 A | 6/1943 |
| JP | 60135124 A | 7/1985 |

(Continued)

OTHER PUBLICATIONS

English Abstract and Machine Translation for Japanese Publication No. 05-069236 A, published Mar. 23, 1993, 11 pgs.

(Continued)

*Primary Examiner* — Ibrahime A Abraham
*Assistant Examiner* — John J Norton
(74) *Attorney, Agent, or Firm* — Fredrikson & Byron, P.A.

(57) ABSTRACT

In a fixing structure and fixing method of a wire bobbin, the wire bobbin is abutted against the regulating member with the bolt inserted into the insertion hole of the wire bobbin. Then, a nut is inserted into a through hole while being kept inclined so that the axis of the through hole is substantially aligned with the axis of the bolt. Thereafter, the inclination of the nut is returned so that the axis of threaded hole becomes substantially aligned with the axis of the bolt, and then the nut is turned so as to insert part of a tapered portion into the insertion hole.

4 Claims, 14 Drawing Sheets

(56) References Cited

U.S. PATENT DOCUMENTS

2017/0050818 A1* 2/2017 Nomura ................ B65H 49/32
2017/0129736 A1   5/2017 Ito et al.

FOREIGN PATENT DOCUMENTS

| JP | 6411732 A | 1/1989 |
| JP | 482621 A | 3/1992 |
| JP | 4126011 U | 11/1992 |
| JP | 569236 A | 3/1993 |
| JP | 2012233535 A | 11/2012 |
| JP | 2016161130 A | 9/2016 |
| KR | 1020050026224 A | 3/2005 |
| WO | 2016117140 A1 | 7/2016 |

OTHER PUBLICATIONS

English Abstract and Machine Translation for Japanese Publication No. 04-082621 A, published Mar. 16, 1992, 11 pgs.
English Abstract and Machine Translation for Japanese Publication No. 64-011732 A, published Jan. 17, 1989, 8 pgs.
English Abstract and Machine Translation for Japanese Publication No. 2012-233535 A, published Nov. 29, 2012, 6 pgs.
English Abstract and Machine Translation for Japanese Publication No. 2016-161130 A, published Sep. 5, 2016, 5 pgs.
English Abstract and Machine Translation for Japanese Publication No. 04-126011 U, published Nov. 17, 1992, 7 pgs.
English Abstract and Machine Translation for Japanese Publication No. 60-135124 A, published Jul. 18, 1985, 5 pgs.
English Abstract and Machine Translation for German Publication No. 102009021597 A1, published Nov. 25, 2010, 7 pgs.
English Machine Translation for French Publication No. 882541 A, published Jun. 7, 1943, 3 pgs.
Extended European Search Report dated Aug. 14, 2018 for related EP Application No. 18162004.8, 7 pgs.
English Abstract and Machine Translation for Korean Publication No. 10-2005-0026224 A, published Mar. 15, 2005, 8 pgs.

* cited by examiner

FIG. 3

| WEIGHT OF WIRE ELECTRODE WOUND ON WIRE BOBBIN [kg] | L[mm] | W[mm] | D[mm] | d[mm] | h[mm] |
|---|---|---|---|---|---|
| 3 | 110 | 90 | 130 | 80 | 20 |
| 5 | 114 | 90 | 160 | 90 | 20 |
| 10 | 134 | 110 | 200 | 110 | 25 |
| 15 | 160 | 128 | 160 | 100 | 22 |

FIXING STRUCTURE OF WIRE BOBBIN AND FIXING METHOD OF THE SAME

CROSS-REFERENCE TO RELATED APPLICATION

This application is based upon and claims the benefit of priority from Japanese Patent Application No. 2017-052133 filed on Mar. 17, 2017, the contents of which are incorporated herein by reference.

BACKGROUND OF THE INVENTION

Field of the Invention

The present invention relates to a fixing structure and fixing method for fixing a wire bobbin to a wire electrical discharge machine.

Description of the Related Art

The wire electrical discharge machine shapes a workpiece in a desired contour shape by generating an electric discharge phenomenon between a wire electrode and the workpiece. Since in this process the wire electrode is consumed as the electric discharge proceeds, the new wire electrode wound on a cylindrical wire bobbin is continuously supplied toward workpiece as the wire bobbin is turned, to thereby implement wire electrical discharge machining. Therefore, it is necessary to replace the wire bobbin with a new wire electrode wound thereon before the wire electrode is used up from the wire bobbin.

To replace wire bobbins, first, the wire bobbin to be replaced is removed from the bolt provided on the wire electrical discharge machine, and the new wire bobbin is attached on the bolt with the bolt inserted into the insertion hole of the bobbin. In this attachment, the wire bobbin is made to abut against a regulating member at one proximal end of the bolt on the wire electrical discharge machine side so as to restrict the movement of the wire bobbin to the proximal side. Then, a nut is fitted with its threaded hole screwed on the distal end of the bolt projected from the insertion hole of the wire bobbin. Thus, the wire bobbin can be attached to the bolt so as not to move in the axial direction owing to the regulating member and the nut. Since this bolt rotates about its axis, the wire bobbin rotates together with the bolt. Here, the replacement work of the wire bobbin is carried out manually by the operator.

However, the operator needs to turn the nut up to the position of the wire bobbin on the distal end side of the bolt. Further, when removing the wire bobbin from the bolt, the operator also needs to turn the nut from the position of the wire bobbin to the distal end of the bolt. As a result, it takes time to attach and detach the wire bobbin.

Furthermore, in the wire electrical discharge machine, the bolt on which the insertion hole of the wire bobbin is fitted is usually located at a position higher than the position where the workpiece is machined. The bolt, in most cases, is mounted horizontally to the wire electrical discharge machine. After fitting the wire bobbin on the bolt by inserting the bolt into the insertion hole, the operator needs to screw the nut on the bolt while supporting the wire bobbin so as to align the rotational center (axis) of the wire bobbin with the axis of the bolt.

Japanese Laid-Open Patent Publication No. 2016-161130 and Japanese Laid-Open Utility Model Publication No. 04-126011 disclose speed-nuts with a through hole that is formed obliquely relative to the axis of the threaded hole so as to leave part of the threaded hole and has an inside diameter greater than the outside diameter of a mating bolt.

SUMMARY OF THE INVENTION

When using the speed-nut disclosed in these publications to fix the wire bobbin to the wire electrical discharge machine, the operator can fix the wire bobbin to the machine by turning the nut relative to the bolt even if the axis of the bolt and the rotational center (axis) of the wire bobbin are not aligned to each other (in a state where the axes are misaligned). As a result, the wire bobbin rotates eccentrically, so that the wire electrode cannot be smoothly pulled out from the wire bobbin and wire electrical discharge machining on the workpiece becomes unstable. Further, under such a state, there is a risk that the nut loosens as the wire bobbin rotates, so that the operator needs to interrupt the wire electric discharge machining and tighten the nut again. As a result, the work efficiency of the wire electric discharge machining decreases.

In view of the above, it is therefore an object of the present invention to provide a fixing structure and fixing method of a wire bobbin, which enables an operator to perform quick attachment and detachment of the wire bobbin to and from a wire electrical discharge machine while having the wire bobbin fixed to the wire electrical discharge machine with the axial center of the wire bobbin substantially aligned with the axial center of the bolt on the wire electrical discharge machine side.

According to a first aspect of the present invention, a fixing structure of a wire bobbin to a wire electrical discharge machine includes: a bolt configured to be inserted into an insertion hole formed in the wire bobbin so as to rotatably support the wire bobbin; a regulating member provided on the proximal end side of the bolt to stop movement of the wire bobbin to the proximal end side of the bolt; and a nut having a threaded hole to be screwed onto the bolt, and constructed such that: the wire bobbin is fixed to the wire electrical discharge machine by the regulating member and the nut so as to be immovable in the axial direction of the bolt and rotatable, in a state where the bolt is inserted in the insertion hole; and the nut has a through hole formed obliquely to an axis of threaded hole so as to leave part of the threaded hole, the through hole having an inside diameter greater than an outside diameter of the bolt, and a tapered portion formed at the end of the nut facing the wire bobbin so that part of the tapered portion is inserted into the insertion hole.

A second aspect of the present invention resides in a fixing method of fixing a wire bobbin to a wire electrical discharge machine having a bolt so as to be immovable in the axial direction of the bolt and rotatable by using a structure including: a bolt configured to be inserted into an insertion hole formed in the wire bobbin so as to rotatably support the wire bobbin; a regulating member provided on a proximal end side of the bolt to stop movement of the wire bobbin to the proximal end side of the bolt; and a nut having a threaded hole to be screwed onto the bolt, wherein the nut has a through hole, formed obliquely to an axis of threaded hole so as to leave part of the threaded hole and having an inside diameter greater than the outside diameter of the bolt, and a tapered portion formed at an end of the nut facing the wire bobbin so that part of the tapered portion is inserted into the insertion hole, and the fixing method includes the steps of: abutting the wire bobbin against the regulating member with the bolt inserted into the insertion hole; bringing the nut close to the wire bobbin while the bolt is inserted into the through hole and the nut is kept inclined so that the axis of the through hole is substantially aligned with the axis of the bolt; returning the inclination of the nut so that the axis of threaded hole becomes substantially aligned with the axis of the bolt; and rotating the nut so as to insert part of the tapered portion into the insertion hole.

According to the present invention, the wire bobbin can be quickly attached to and detached from the wire electrical discharge machine. Further, the bolt and the nut can be screwed in a state where the axis of the bolt is substantially aligned with the axis of the insertion hole of the wire bobbin (the rotational center of the wire bobbin), whereby it is possible to correctly fix the wire bobbin to the wire electrical discharge machine.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a chart showing the relationship between the weight of the wire electrode wound on the wire bobbin and the size of the wire bobbin;

DESCRIPTION OF THE PREFERRED EMBODIMENTS

A fixing structure and a fixing method of a wire bobbin according to the present invention will be detailed hereinbelow by describing a preferred embodiment with reference to the accompanying drawings.

[Configuration of Wire Electrical Discharge Machine]

Figure 1:
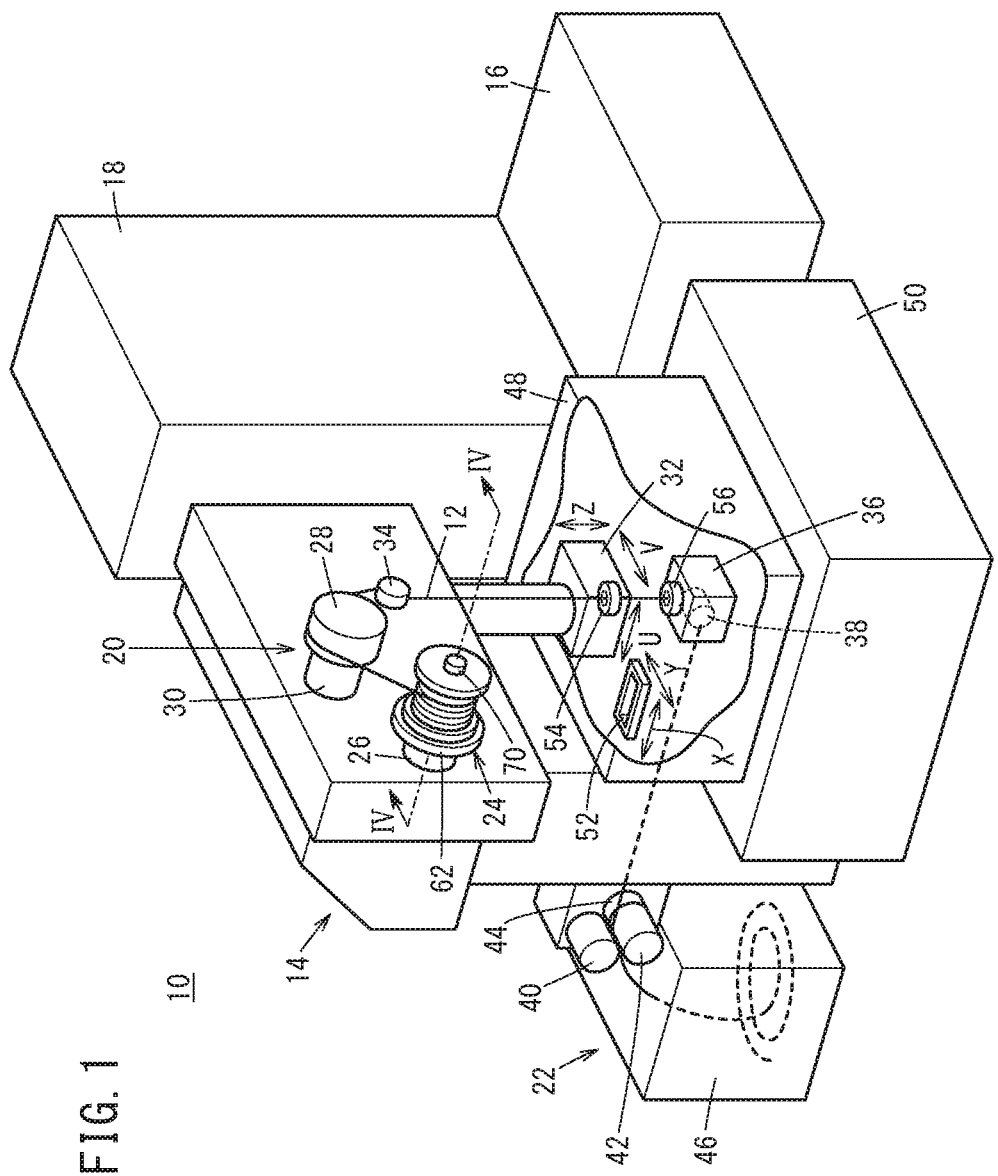
FIG. 1 is a perspective view of a wire electrical discharge machine to which a wire bobbin fixing structure according to an embodiment is applied.

FIG. 1 is a perspective view showing an overall configuration of a wire electrical discharge machine 10. The wire electrical discharge machine 10 applies voltage across an electrode gap (clearance) formed between a wire electrode 12 and a workpiece (not shown) for electrical discharges, thereby performing electrical discharge machining on the workpiece. The wire electrode 12 is formed of, for example, tungsten-based, copper alloy-based, brass-based metal or the like. On the other hand, the material of the workpiece is, for example, a metal material such as an iron-based material or a superhard material.

The wire electrical discharge machine 10 includes a main machine body 14, a dielectric fluid unit 16 and a numerical controller 18. The main machine body 14 includes a feed path 20 for feeding the wire electrode 12 toward the workpiece and a collecting path 22 for collecting the wire electrode 12 having passed through the workpiece.

The feed path 20 includes a wire bobbin 24 on which the wire electrode 12 is wound, a torque motor 26 for applying torque to the wire bobbin 24, a brake roller 28 for applying a braking force by friction to the wire electrode 12 pulled from the wire bobbin 24, a brake motor 30 for applying brake torque to the brake roller 28 and an upper wire guide 32 disposed above the workpiece for guiding the wire electrode 12. A tension detector 34 for detecting the tension of the wire electrode 12 is provided between the brake motor 30 and the upper wire guide 32. As will be described later, the wire bobbin 24 is attached in a replaceable manner to the wire electrical discharge machine 10, at a position higher than (the machining position) of the workpiece.

The collecting path 22 includes a lower wire guide 36 disposed below the workpiece for guiding the wire electrode 12, a lower guide roller 38 provided in the lower wire guide 36, a pinch roller 40 and a feed roller 42 for nipping the wire electrode 12 therebetween, a torque motor 44 for applying torque to the feed roller 42 and a wire collecting box 46 for collecting the wire electrode 12.

The main machine body 14 includes a work-pan 48 capable of storing a dielectric working fluid such as deionized water or oil used for electrical discharge machining. The upper wire guide 32 and the lower wire guide 36 are installed in the work-pan 48. The work-pan 48 is placed on a base portion 50.

A worktable 52 having the workpiece placed thereon is disposed in the work-pan 48. The worktable 52 is provided so as to be movable on the horizontal plane in the X-axis direction and the Y-axis direction orthogonal to the X-axis by servomotors (not shown). The worktable 52 is arranged between the upper wire guide 32 and the lower wire guide 36.

The upper wire guide 32 has an upper die guide 54 for supporting the wire electrode 12 on the upper side and the lower wire guide 36 has a lower die guide 56 for supporting the wire electrode 12 on the lower side. The upper wire guide 32 can move in a U-axis direction parallel to the X-axis, a V-axis direction parallel to the Y-axis and a Z-axis direction orthogonal to the X-axis and the Y-axis by unillustrated servomotors. This enables the main machine body 14 to perform machining on the workpiece to have different figure at top and bottom surfaces.

The upper wire guide 32 and the lower wire guide 36 eject a clean dielectric working fluid not containing sludge (machined waste). This makes it possible to fill the clearance (electrode gap) between the wire electrode 12 and the workpiece with the clean working fluid suitable for electrical discharge machining and prevent deterioration in accuracy of electrical discharge machining due to the sludge produced during electrical discharge machining. Therefore, in the main machine body 14, electric discharge machining is performed while the workpiece is immersed in the working fluid stored in the work-pan 48.

The dielectric fluid unit 16 is a device for removing the sludge contained in the working fluid in the work-pan 48, controlling the electric resistivity and the temperature of the working fluid and managing the quality of the working fluid. The working fluid is quality controlled by this working fluid treatment apparatus 16 and returned to the work-pan 48 again. The numerical controller 18 controls the main machine body 14 according to an NC program.

[Configuration of Wire Bobbin]

Figure 2B:
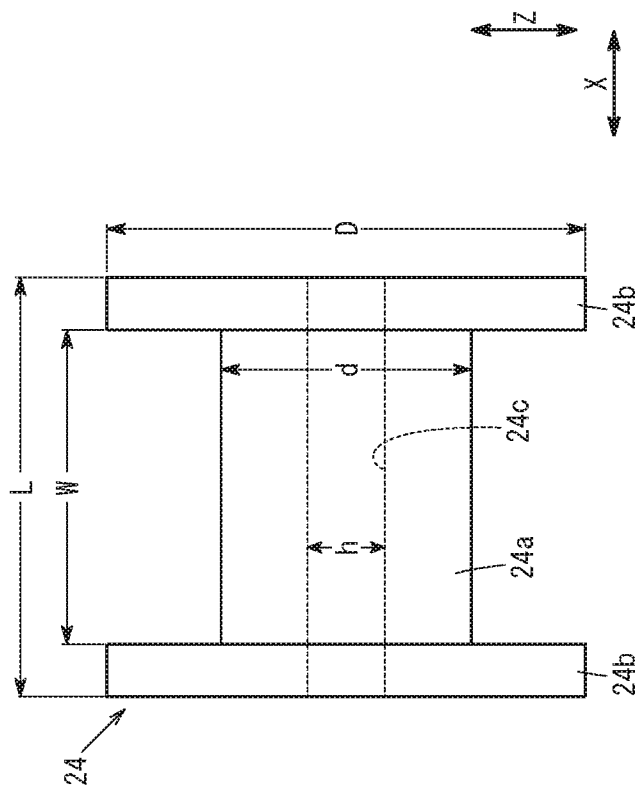
FIGS. 2A and 2B are front and side views, respectively, of a wire bobbin.
Figure 2A:
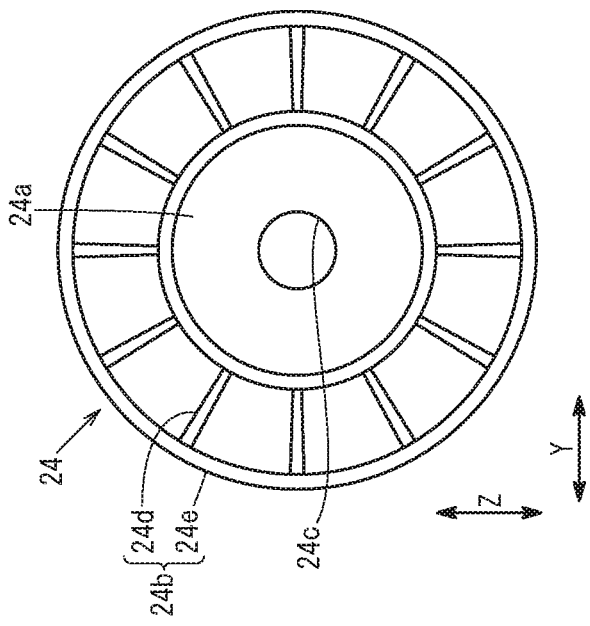
Figure 4:
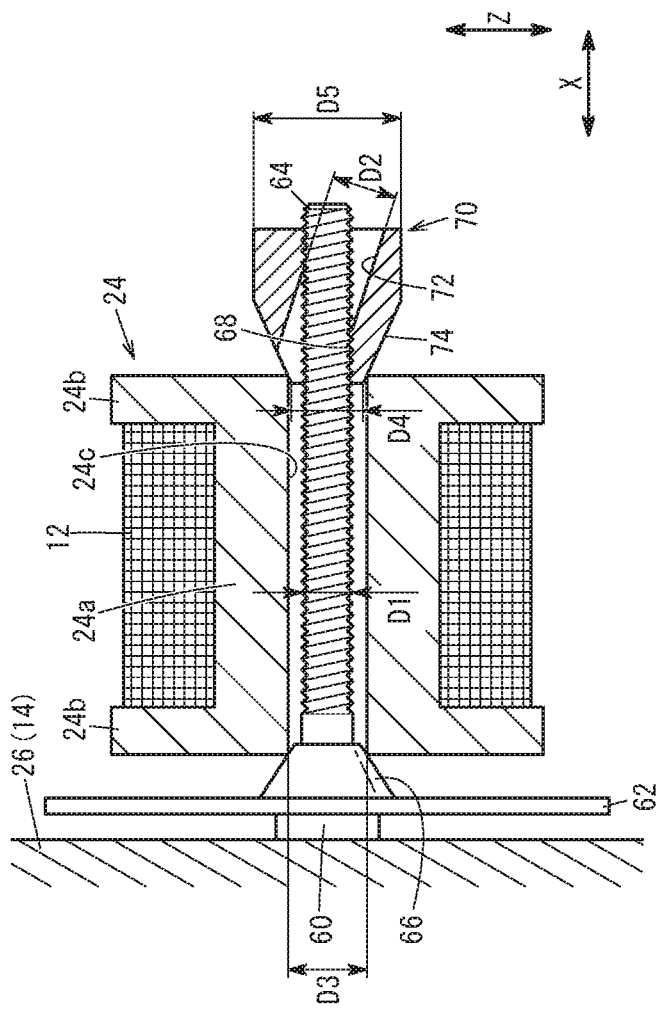
FIG. 4 is a sectional view showing the fixing structure of the wire bobbin taken along line IV-IV in FIG. 1.

Next, the wire bobbin 24 used in the wire electrical discharge machine 10 will be described. FIGS. 2A and 2B are front and side views, respectively, of the wire bobbin 24 with no wire electrode 12 wound. FIG. 3 is a chart showing the relationship between the weight of the wire electrode 12 wound on the wire bobbin 24 and the size of the wire bobbin 24. FIG. 4 is a sectional view taken along the line IV-IV in FIG. 1.

As shown in FIGS. 2A and 2B, the wire bobbin 24 is a commercially available one, and includes a cylindrical portion 24a forming an axial core on which a certain amount of the wire electrode 12 (see FIGS. 1 and 4) is wound, flanges 24b extending radially at both ends of the cylindrical portion 24a and an insertion hole 24c penetrating through the center of the cylindrical portion 24a in the longitudinal direction (in the X-axis direction) thereof. As shown in FIG. 2A, each of the flanges 24b arranged at both ends of the cylindrical portion 24a includes multiple spokes 24d extended radially and arranged equi-angularly in the circumferential direction and a rim 24e connecting the distal ends of the multiple spokes 24d. The configuration of the flange 24b may have any form such as a disc and the like as long as it can keep the wire electrode 12 wound on the cylindrical portion 24a from shifting in the aforementioned longitudinal direction, at both ends of the cylindrical portion 24a.

The size of the wire bobbin 24 is standardized, and as shown in FIG. 3, it varies depending on the weight of the wire electrode 12 wound on the cylindrical portion 24a. More specifically, the dimension of the wire bobbin 24 in the longitudinal direction (X-axis direction), designated at L, the dimension of the cylindrical portion 24a in the X-axis direction (the length of the cylindrical portion 24a on which the wire electrode 12 can actually be wound), designated at W, i.e., the dimension obtained by subtracting the thickness of the two flanges 24b from the dimension L in the X-axis direction, the diameter of the cylindrical portion 24a, designated at d, the inside diameter of the insertion hole 24c, designated at h, and the diameter of the flange 24b, designated at D, all vary depending on the weight of the wire electrode 12 to be wound on the cylindrical portion 24a.

[Fixing Structure of Wire Bobbin]

Referring now to FIG. 4, the fixing structure of the wire bobbin 24 thus configured will be described. This fixing structure is arranged above the machining position of the workpiece in the feed path 20 of the main machine body 14 (see FIGS. 1 and 4) and detachably fixes the wire bobbin 24 to the main machine body 14. Specifically, this fixing structure includes: a disk-like regulating member 62, joined to a rotating shaft 60 of the torque motor 26 extending in the horizontal direction (X-axis direction) from the main machine body 14 with its center (axis) substantially aligned with the axis of the rotating shaft 60; a bolt 64 extending in the X-axis direction from the regulating member 62 so as to be substantially aligned with the axes of the rotating shaft 60 and the regulating member 62; a tapered portion 66 formed at the joint of the bolt 64 to the regulating member 62 (the proximal end of the bolt 64 on the regulating member 62 side); and a nut 70 having a female threaded hole 68 mating with the bolt 64. The tapered portion 66 has a form that reduces in diameter from the regulating member 62 toward the male thread of the bolt 64. Although the rotating shaft 60 is assumed to be the axle of the torque motor 26, the rotating shaft 60 may be rotatably supported by unillustrated bearings and rotated by an unillustrated rotational driving device of another kind.

As shown in FIG. 4, in addition to the threaded hole 68, the nut 70 has a through hole 72 obliquely formed with respect to the axis of the threaded hole 68 so that part of the threaded hole 68 remains, and a tapered portion 74 formed at one end of the nut 70 opposing the insertion hole 24c of the wire bobbin 24 and having a part (the end portion) thereof inserted into the insertion hole 24c of the wire bobbin 24. This through hole 72 is formed obliquely to the threaded hole 68 so as to leave part of the threaded hole 68 at both ends (both ends along the X-axis direction in FIG. 4) along the axis of the nut 70 (the axis of the threaded hole 68).

Here, the outside diameter of the bolt 64 is denoted at D1, the inside diameter of the through hole 72 is denoted at D2, the inside diameter of the insertion hole 24c is denoted at D3 (=h), the outside diameter at the front end of the tapered portion 74 opposing the wire bobbin 24 and the bolt 64 is denoted at D4, and the diameter of the nut 70 on the other side of the wire bobbin 24 is denoted at D5, the inside diameter D2 of the through hole 72 is set to be greater than the outside diameter D1 of the bolt 64 (D1<D2) and the inside diameter D3 of the insertion hole 24c is set to be greater than the outside diameter D4 at the front end of the tapered portion 74 (D3>D4). The inside diameter D3 of the insertion hole 24c is greater than the outside diameter D1 of the bolt 64 (D1<D3). Further, the diameter D5 of the nut 70 (the diameter of the part other than the tapered portion 74) is greater than the inside diameter D3 of the insertion hole 24c (D3<D5).

[Method of Fixing Wire Bobbin]

Next, a fixing method of the wire bobbin 24 of the present embodiment applied to the wire electrical discharge machine 10 will be described with reference to FIGS. 5 to 11. Here, the case where the wire bobbin 24 is attached to the bolt 64 provided in the wire electrical discharge machine 10 (see FIGS. 5 to 9B) and the case where the wire bobbin 24 is detached from the bolt 64 (see FIGS. 10 and 11) will be explained separately. The work of attaching and detaching the wire bobbin 24 is performed manually by an operator.

First, the case of attaching the wire bobbin 24 will be described with reference to FIGS. 5 to 9B.

Figure 5:
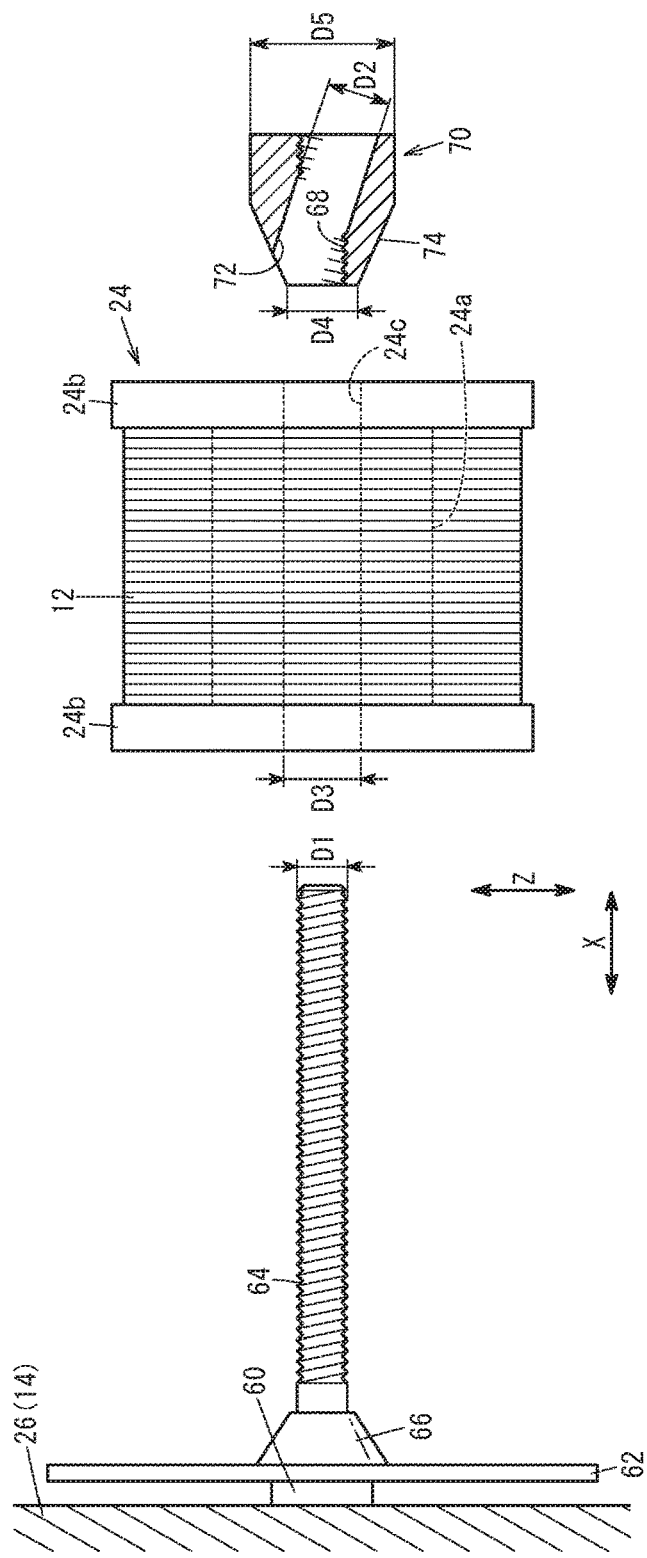
FIG. 5 is a side view for explaining a fixing method of the wire bobbin according to the embodiment.

FIG. 5 is a side view showing a state before the wire bobbin 24 is attached to the wire electrical discharge machine 10 (see FIG. 1). When attaching the wire bobbin 24 to the wire electrical discharge machine 10, the operator first moves the wire bobbin 24 to the bolt 64 side. In this case, since D1<D3, the bolt 64 is inserted into the insertion hole 24c.

Figure 6:
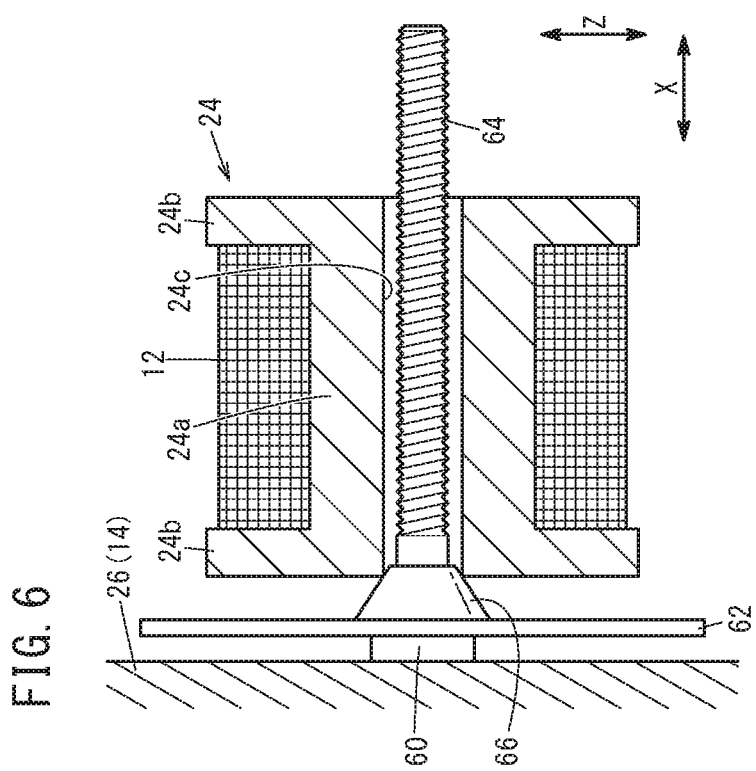
FIG. 6 is a sectional view showing a state in which a bolt is inserted into an insertion hole of a wire bobbin.

When the operator moves the wire bobbin 24 with the bolt 64 inserted therein to the regulating member 62 side, the flange 24b of the wire bobbin 24 on the regulating member 62 side abuts against the tapered portion 66, and part of the tapered portion 66 enters the insertion hole 24c (the step of abutting the wire bobbin 24 against the regulating member 62), as shown in FIG. 6. As a result, the wire bobbin 24 is restrained from moving toward the regulating member 62 by the regulating member 62 (more specifically, the tapered portion 66), whereas the distal end of the bolt 64 sticks out in the X-axis direction from the insertion hole 24c.

Figure 7:
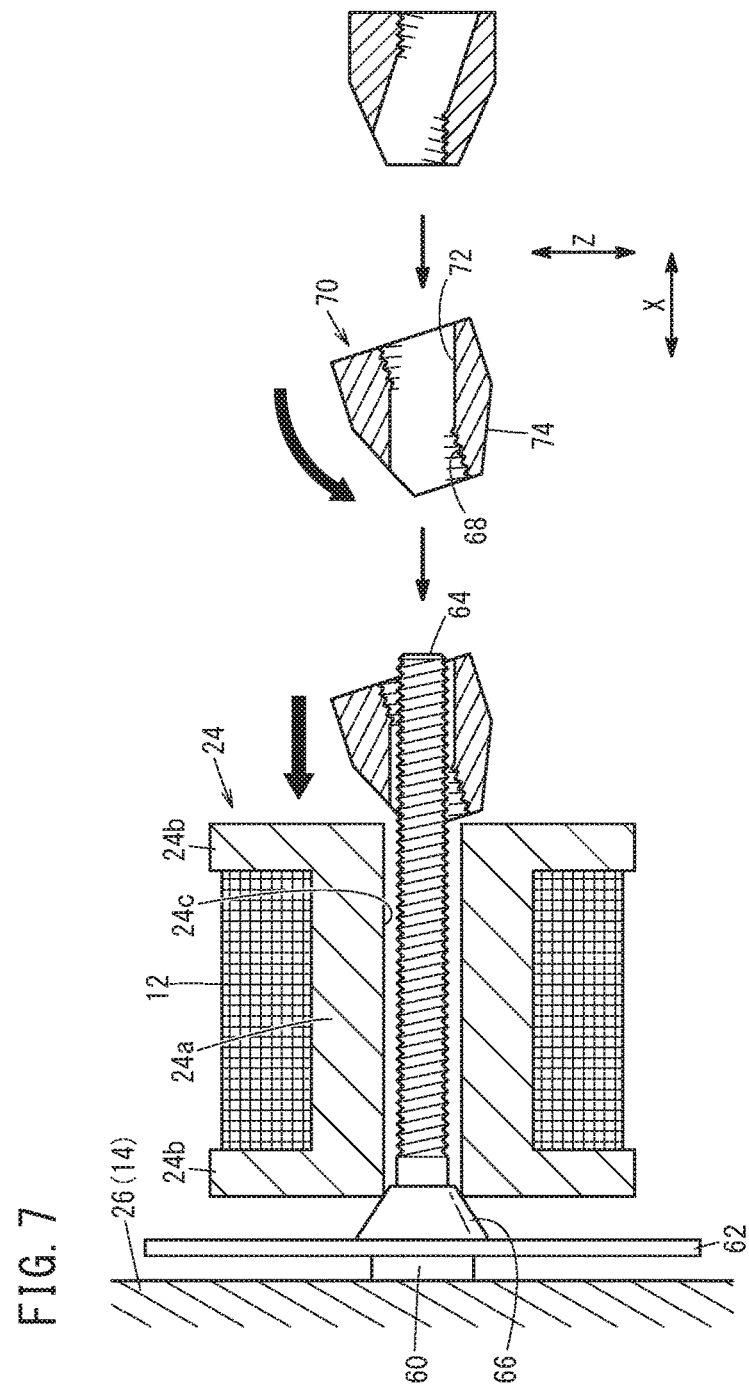
FIG. 7 is a sectional view illustrating a state where the through hole of a nut is inserted into the distal end side of the bolt projected from the insertion hole of the wire bobbin.

Next, as shown in FIG. 7, the operator inclines the nut 70 so that the bolt 64 is inserted into the through hole 72 of the nut 70, or the axis of the through hole 72 of the nut 70 becomes substantially aligned with the axis of the bolt 64 (on the distal end side). Next, the operator moves the nut 70 toward the bolt 64 as keeping the nut in this position. In this case, since D1<D2 (see FIG. 5), the bolt 64 is inserted into the through hole 72. As a result, the nut 70 can be put close to the wire bobbin 24 with the bolt 64 inserted in the through hole 72 (the step of bringing the nut 70 close to the wire bobbin 24).

Figure 8:
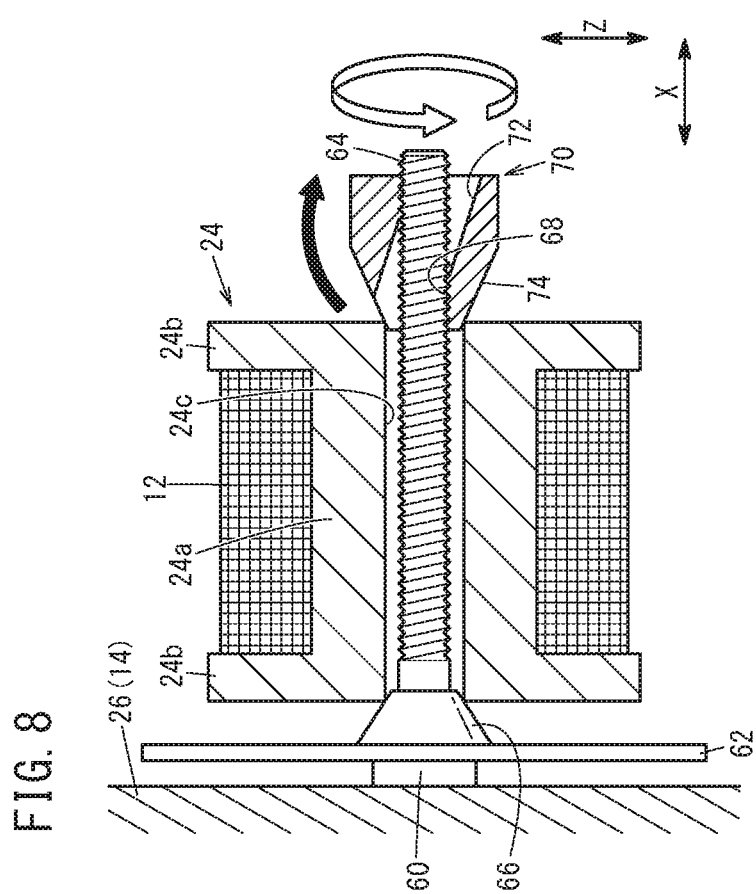
FIG. 8 is a sectional view illustrating a state in which the nut is screwed to the distal end side of the bolt while part of a tapered portion is inserted into the insertion hole.

Next, as shown in FIG. 8 the operator returns the inclination of the nut 70 to the horizontal position at a position close to the insertion hole 24c on the distal end of the bolt 64 so that the axis of threaded hole 68 of the nut 70 is substantially aligned with the axis of the bolt 64 (the step of returning inclination of the nut 70). As a result, the threaded hole 68 becomes engaged with the bolt 64.

Then, in the state in which the threaded hole 68 and the bolt 64 are engaged with each other, the operator turns the nut 70 about the axis (in the rotational direction indicated by the outlined arrow in FIG. 8 to tighten the nut 70). In this case, since D3>D4 (see FIG. 5), the nut 70 moves toward the wire bobbin 24 in the X-axis direction, and part (front end) of the tapered portion 74 is fitted into the insertion hole 24c (the step of inserting part of the tapered portion 74 into the insertion hole 24c). As a result, the nut 70 is held by the wire bobbin 24 so that the posture of the nut 70 is maintained. Further, the wire bobbin 24 is positioned with respect to the X-axis direction between the regulating member 62 (more specifically, the tapered portion 66) and the nut 70 (more specifically, the tapered portion 74).

Further, by inserting part of the tapered portion 66 and part of the tapered portion 74 into the insertion hole 24c, the wire bobbin 24 is fixed and supported in such a position as to be substantially aligned with each of the axes of the rotating shaft 60 and the bolt 64. That is, the tapered portions 66 and 74 enable the wire bobbin 24 to be set with its axis (the axial center of the insertion hole 24c) substantially in a line with axes of the rotating shaft 60 and the bolt 64. Accordingly, as the rotating shaft 60 rotates by the drive of the torque motor 26, the wire bobbin 24 set substantially aligned with the axis of the rotating shaft 60 turns together with the rotating shaft 60 on the axis of the rotating shaft 60. That is, the wire bobbin 24 is fixed in a rotatable manner to the wire electrical discharge machine 10.

Figure 9A:
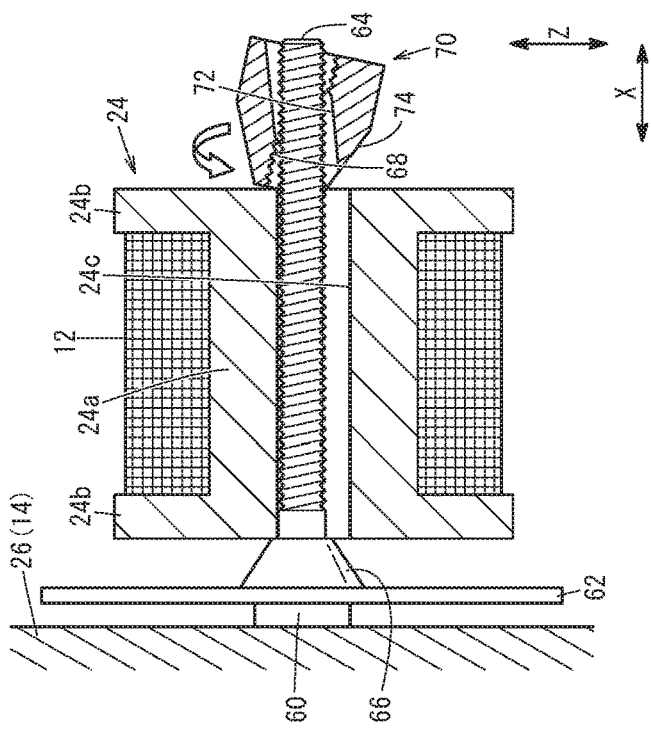
FIGS. 9A and 9B are sectional views illustrating cases where the axial center of the bolt and the axial center of the insertion hole are misaligned.
Figure 9B:
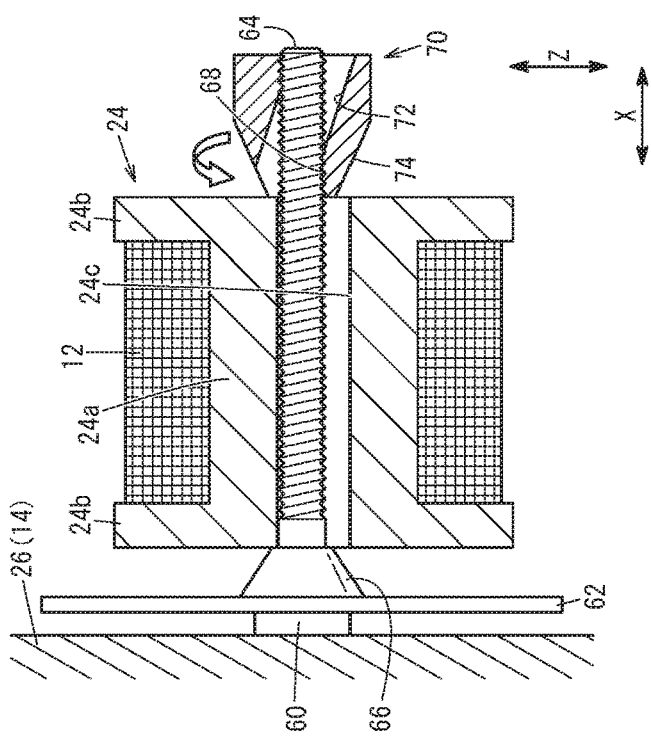

Here, when the nut 70 is screwed and tightened by engaging the threaded hole 68 of the nut 70 with the bolt 64 in a state where the tapered portion 66 and the tapered portion 74 of the nut 70 are not inserted into the insertion hole 24c of the wire bobbin 24 as shown in FIG. 9A, the nut 70 cannot be kept in the correct posture so that the nut 70 tilts as shown in FIG. 9B. Accordingly, the wire bobbin 24 cannot be attached to the bolt 64.

Thus, according to the present embodiment, it is possible to correctly fix the wire bobbin 24 to the wire electrical discharge machine 10 and improve the efficiency of the attachment work for wire electric discharge machining.

Next, the case of detaching the wire bobbin 24 from the wire electrical discharge machine 10 will be described with reference to FIGS. 8, 10 and 11.

Figure 10:
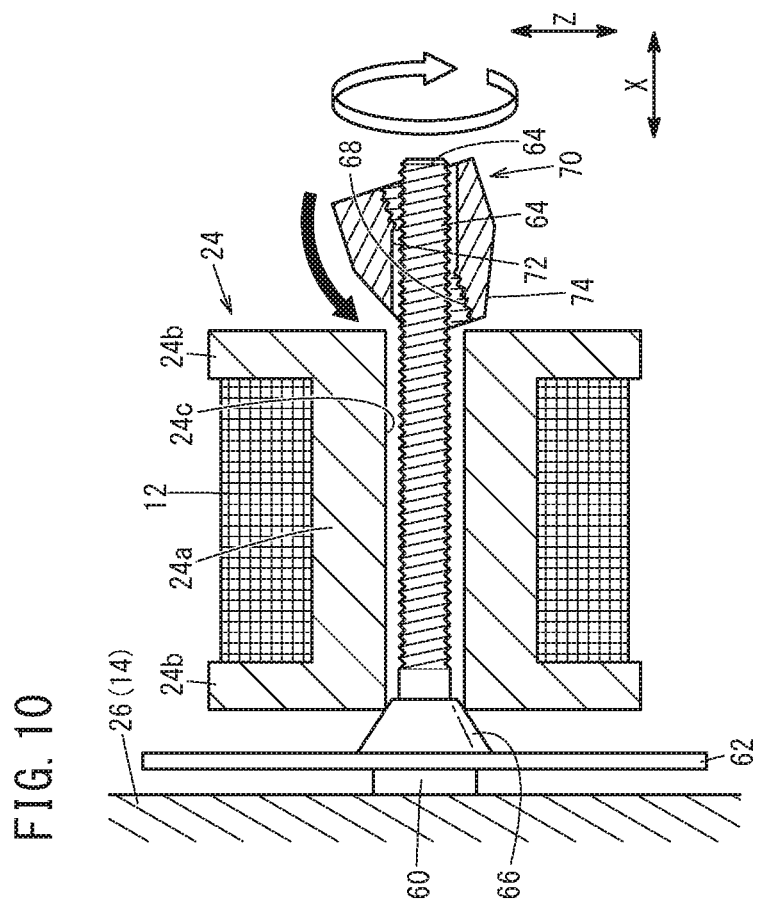
FIG. 10 is a sectional view illustrating a state in which the nut is loosened from the fixed wire bobbin.
Figure 11:
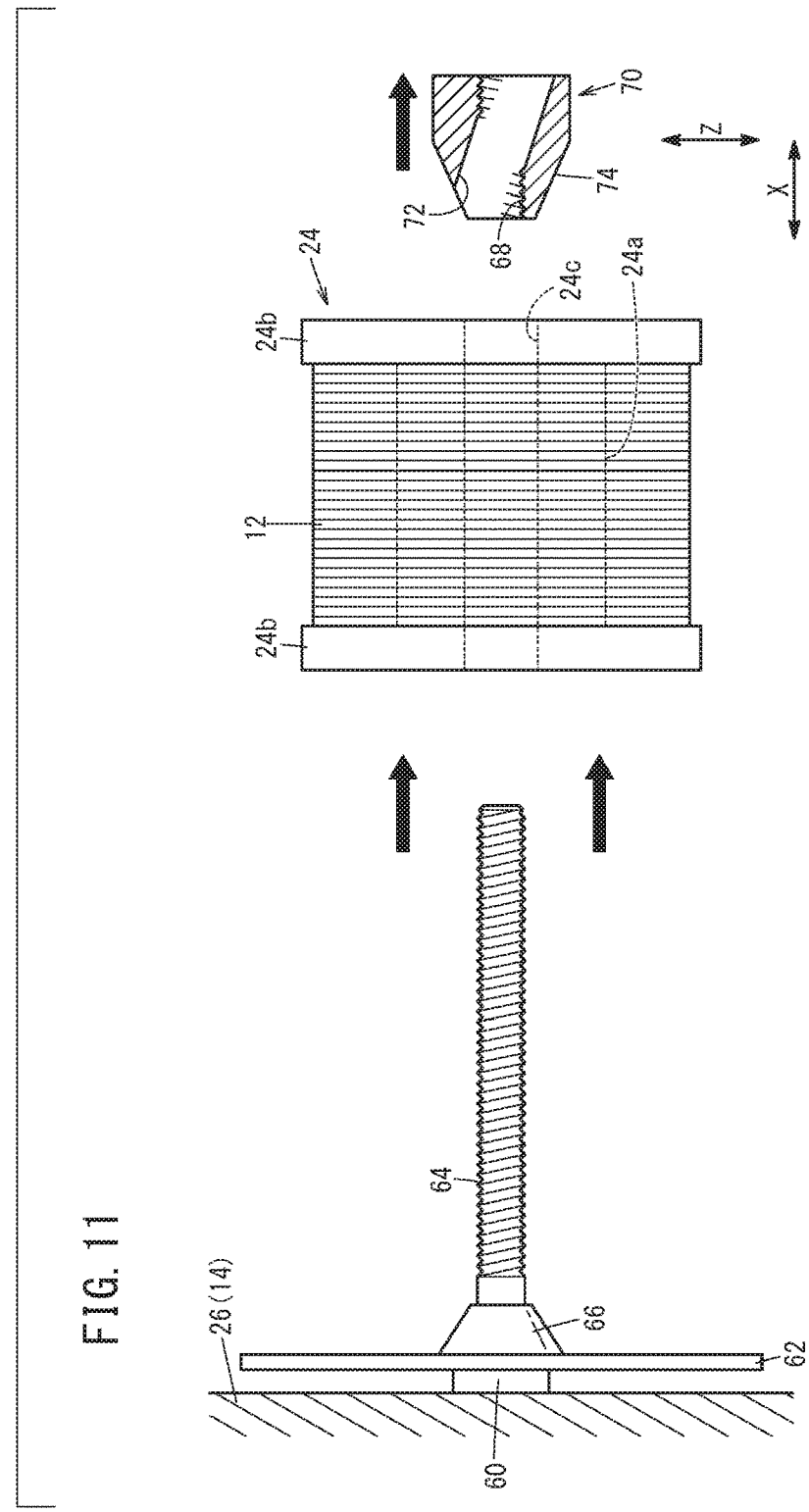
FIG. 11 is a side view illustrating a state in which the nut and the wire bobbin are detached from the bolt.

First, in the mounted state shown in FIG. 8, when the operator turns the nut 70 in the rotational direction indicated by the outlined arrow in FIG. 10 (the direction of loosening the nut 70), the tapered portion 74 comes off the insertion hole 24c so that the nut 70 can be inclined.

Then, the operator removes the nut 70 from the wire bobbin 24 while keeping the nut 70 tilted so as to hold the axis of the through hole 72 of the nut 70 and the axis of the bolt 64 substantially aligned. Thus, the nut 70 is withdrawn from the bolt 64 as shown in FIG. 11. As a result, the wire bobbin 24 is released from the state of being fixed with respect to the X-axis direction.

Next, the operator separates the wire bobbin 24 from the tapered portion 66 and pulls out the wire bobbin 24 from the bolt 64. As a result, the wire bobbin 24 is removed from the wire electrical discharge machine 10.

[Effect of Fixing Structure and Fixing Method of Wire Bobbin]

Now, effects of the fixing structure and the fixing method of the wire bobbin 24 according to the present embodiment described above will be described in comparison with the comparative examples shown in FIGS. 12 to 14.

Figure 12:
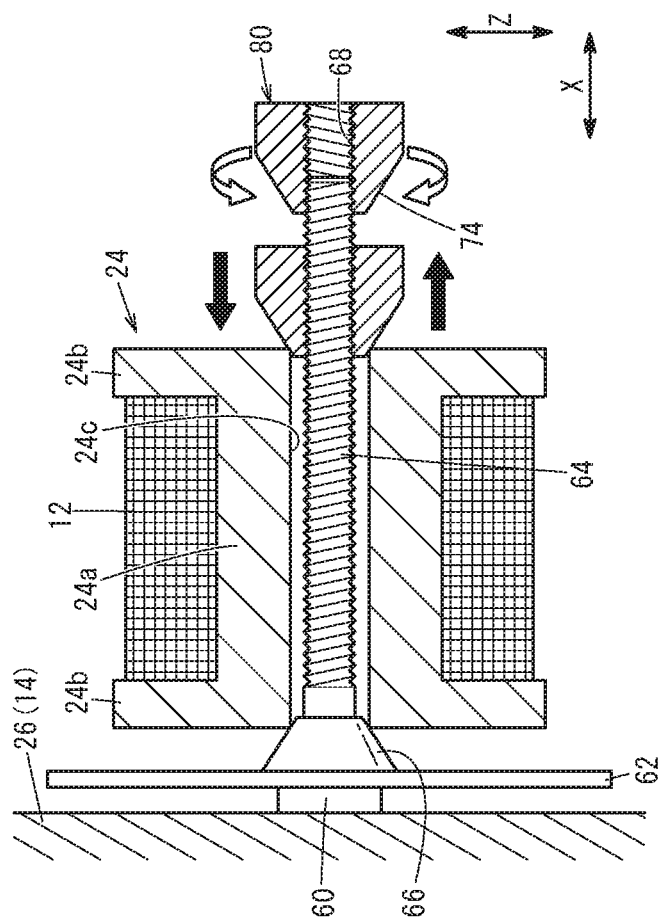
FIG. 12 is a sectional view of a first comparative example.
Figure 13:
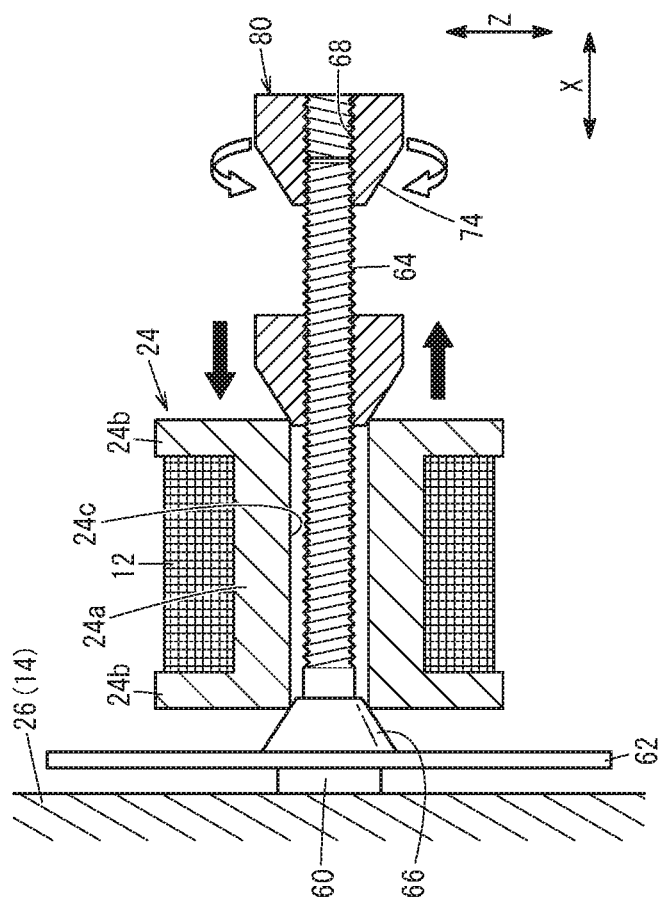
FIG. 13 is a sectional view of the first comparative example.

FIG. 12 and FIG. 13 are explanatory diagrams showing the first comparative example. The same components as those of the fixing structure and fixing method of the wire bobbin 24 of the above embodiment described with reference to FIGS. 2 to 10 are denoted with the same reference numerals, and the detailed description thereof is omitted. The first comparative example of FIGS. 12 and 13 is different from the fixing structure and fixing method of the wire bobbin 24 of the above embodiment in that the nut 80 screwed into the bolt 64 has no through hole 72.

As shown in FIG. 12, in the first comparative example, since the through hole 72 is not formed in the nut 80, the operator needs to engage the threaded hole 68 of the nut 80 on the distal end of the bolt 64 protruding from the wire bobbin 24 and turn the nut 80 up to the position near the wire bobbin 24 on the distal end side of the bolt 64 to fix the wire bobbin 24. That is, in the case of the first comparative example, it is necessary to turn and feed the nut 80 on the distal end side of the bolt 64 along all the portion that does not contribute to the fixing of the wire bobbin 24. Further, in the first comparative example, when removing the wire bobbin 24, the operator needs to turn the nut 80 from the side of the wire bobbin 24 to the distal end of the bolt 64. Thus, in the first comparative example, it takes time to attach and detach the wire bobbin 24.

Further, as shown in FIG. 13, when the dimension L of the wire bobbin 24 in the X-axis direction (see FIG. 2B) is small because the total length of the wire electrode 12 wound around the wire bobbin 24 is short (the weight of the wire electrode 12 is small), a longer part of the bolt 64 is projected from the distal end side of the wire bobbin 24. As a result, the portion on the distal end side of the bolt 64 which does not contribute to the fixing of the wire bobbin 24 becomes longer, so that the operator needs to turn the nut 80 an increased number of times, hence the time for attachment and detachment of the wire bobbin 24 is further prolonged.

Figure 14:
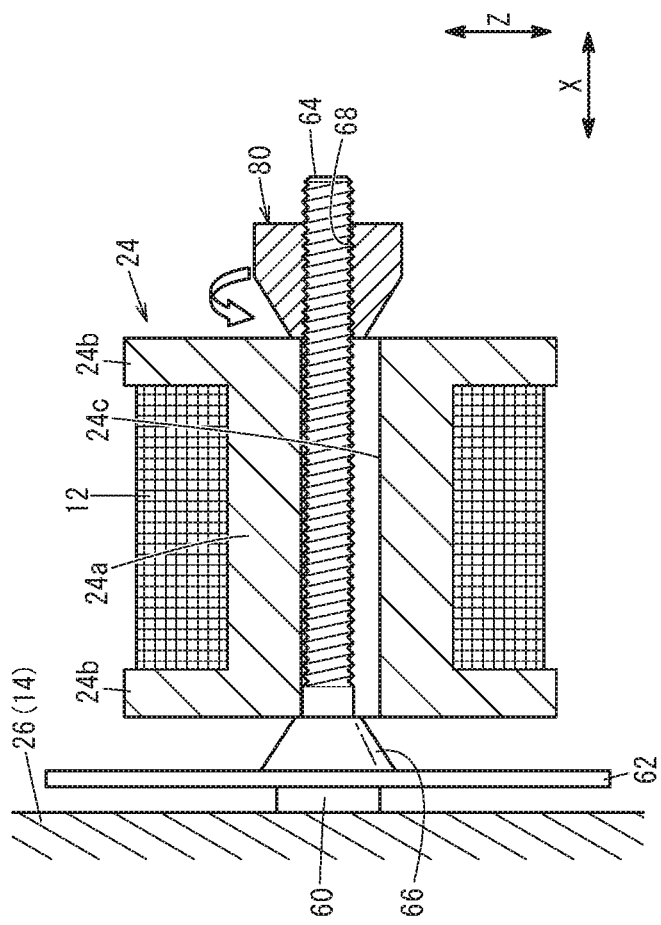
FIG. 14 is a sectional view of a second comparative example.

FIG. 14 is an illustrative diagram of a second comparative example for explaining a case where the wire bobbin 24 is fixed by screwing the nut 80 with the threaded hole 68 from the distal end side of the bolt 64 when the axis of the bolt 64 and the axis of the insertion hole 24c of the wire bobbin 24 are misaligned with each other so that the wire bobbin 24 is supported off-centered from the bolt 64. That is, in the second comparative example, the wire bobbin 24 is fixed between the regulating member 62 and the nut 80 in an off-centered state where the axial center of the wire bobbin 24 is deviated from the axes of the rotating shaft 60, the regulating member 62, the tapered portion 66 and the bolt 64.

That is, even if the axis of the insertion hole 24c of the wire bobbin 24 and the axis of the threaded hole 68 of the nut 80 are misaligned or in an off-centered state, the wire bobbin 24 can be fixed to the wire discharge machine 10 when the operator screws the nut 80 onto the bolt 64. Therefore, there is a risk that the operator cannot notice that the wire bobbin 24 is fixed in an off-centered condition. As a result, in performing wire electric discharge machining on a workpiece, the wire electrode 12 cannot be smoothly pulled from the wire bobbin 24 to cause a risk that the wire electric discharge machining on the workpiece becomes unstable. Further, in this state, there is a possibility that the nut 80 is loosened as the wire bobbin 24 turns. Once such a case happens, the operator has to interrupt wire electric discharge machining and tighten the nut 80 again. As a result, the work efficiency of the wire electric discharge machining is decreased.

In contrast, in the fixing structure and fixing method of the wire bobbin 24 of the present embodiment, adoption of the structure and method described with FIGS. 4 to 11 enables the operator to quickly fix the wire bobbin 24 to the wire electrical discharge machine 10, hence it is possible to shorten the time for attachment as well as the time for removal. Further, the wire bobbin 24 having a short total dimension L in the X-axis direction can also be attached and detached in a short time. Furthermore, the wire bobbin 24 can be correctly fixed to the wire electrical discharge machine 10 while the work efficiency of wire electric discharge machining can be improved.

Though in the above embodiment the tapered portion 66 is provided, the tapered portion 66 is not essential. Even in this case, the axial center of the bolt 64 and the axial center of the wire bobbin 24 (the axial center of the insertion hole 24c) can be substantially aligned in combination of the regulating member 62 and the tapered portion 74 formed in the nut 70.

Technical Idea Obtained from the Embodiment

Technical ideas that can be grasped from the above embodiment will be described below.

A fixing structure of a wire bobbin (24) to a wire electrical discharge machine (10) includes: a bolt (64) configured to be inserted into an insertion hole (24c) formed in the wire bobbin (24) so as to rotatably support the wire bobbin (24); a regulating member (62) provided on a proximal end side of the bolt (64) to stop movement of the wire bobbin (24) to the proximal end side of the bolt (64); and a nut (70) having a threaded hole (68) to be screwed onto the bolt (64). In this fixing structure, the wire bobbin (24) is fixed to the wire electrical discharge machine (10) by the regulating member (62) and the nut (70) so as to be immovable in the axial direction of the bolt (64) and rotatable, in a state where the bolt (64) is inserted in the insertion hole (24c), and the nut (70) has a through hole (72), formed obliquely to an axis of threaded hole (68) so as to leave part of the threaded hole (68), the through hole (72) having an inside diameter (D2) greater than the outside diameter (D1) of the bolt (64), and a tapered portion (74) formed at an end of the nut (70) facing the wire bobbin (24) so that part of the tapered portion is inserted into the insertion hole (24c).

This configuration enables the wire bobbin (24) to be quickly attached to and detached from the wire electrical discharge machine (10). Further, the bolt (64) and the nut (70) can be screwed in a state where the axis of the bolt (64) is substantially aligned with the axis of the insertion hole (24c) of the wire bobbin (24), whereby it is possible to correctly fix the wire bobbin (24) to the wire electrical discharge machine (10).

In the fixing structure of the wire bobbin (24), the regulating member (62) may be formed with a second tapered portion (66) that has the same axis with the bolt (64) and is partly inserted into the insertion hole (24c). This arrangement enables the wire bobbin (24) to be attached with the axis of bolt (64) and the axis of the insertion holes (24c) of the wire bobbin (24) precisely aligned with each other, by the combination of the tapered portion (66) on the regulating member (62) side and the tapered portion (74) of the nut (70).

Although certain preferred embodiments of the present invention have been shown and described in detail, it should be understood that various changes and modifications may be made therein without departing from the scope of the appended claims.

What is claimed is:

1. A fixing structure of a wire bobbin to a wire electrical discharge machine comprising:
   a bolt configured to be inserted into an insertion hole formed in the wire bobbin so as to rotatably support the wire bobbin;
   a regulating member provided on a proximal end side of the bolt to stop movement of the wire bobbin to the proximal end side of the bolt; and
   a nut having a threaded hole to be screwed onto the bolt, wherein:
   the wire bobbin is fixed to the wire electrical discharge machine by the regulating member and the nut so as to be immovable in an axial direction of the bolt but rotatable, in a state where the bolt is inserted in the insertion hole;
   the nut comprises:
   a through hole formed obliquely to an axis of the threaded hole so as to leave part of the threaded hole, the through hole having an inside diameter greater than an outside diameter of the bolt, and
   a tapered portion formed at an end of the nut facing the wire bobbin so that part of the tapered portion is inserted into the insertion hole.

2. The fixing structure of the wire bobbin according to claim 1, wherein the regulating member is formed with another tapered portion that has a same axis with the bolt and is partly inserted into the insertion hole.

3. A fixing method of fixing a wire bobbin to a wire electrical discharge machine having a bolt so as to be immovable in an axial direction of the bolt but rotatable by using a structure including: a bolt configured to be inserted into an insertion hole formed in the wire bobbin so as to rotatably support the wire bobbin; a regulating member provided on a proximal end side of the bolt to stop movement of the wire bobbin to the proximal end side of the bolt; and a nut having a threaded hole to be screwed onto the bolt, wherein the nut has a through hole formed obliquely to an axis of the threaded hole so as to leave part of the threaded hole, the through hole having an inside diameter greater than an outside diameter of the bolt and, a tapered portion formed at an end of the nut facing the wire bobbin so that part of the tapered portion is inserted into the insertion hole,
   the fixing method comprising the steps of:
   abutting the wire bobbin against the regulating member with the bolt inserted into the insertion hole;
   bringing the nut close to the wire bobbin while the bolt is inserted into the through hole and the nut is kept inclined so that an axis of the through hole is substantially aligned with an axis of the bolt;

returning the inclination of the nut so that the axis of the threaded hole becomes substantially aligned with the axis of the bolt; and rotating the nut so as to insert part of the tapered portion into the insertion hole.

4. The method of fixing a wire bobbin according to claim 3, wherein the step of abutting the wire bobbin against the regulating member is performed by abutting the wire bobbin against another tapered portion that is formed on the regulating member so as to have a same axis with the bolt, and inserting part of the other tapered portion into the insertion hole.

* * * * *